No. 672,419. Patented Apr. 16, 1901.
F. A. JOHNSON.
MEANS FOR CONTROLLING ELECTRIC MOTORS.
(Application filed Jan. 15, 1901.)
(No Model.) 2 Sheets—Sheet 1.

No. 672,419. Patented Apr. 16, 1901.
F. A. JOHNSON.
MEANS FOR CONTROLLING ELECTRIC MOTORS.
(Application filed Jan. 15, 1901.)

(No Model.) 2 Sheets—Sheet 2.

Witnesses
J. G. Hinkel
H. L. Ogden Jr.

Inventor
Frederic A. Johnson
By
Attorneys

UNITED STATES PATENT OFFICE.

FREDERIC AYRES JOHNSON, OF BINGHAMTON, NEW YORK, ASSIGNOR TO STOW MANUFACTURING COMPANY, OF SAME PLACE.

MEANS FOR CONTROLLING ELECTRIC MOTORS.

SPECIFICATION forming part of Letters Patent No. 672,419, dated April 16, 1901.

Application filed January 15, 1901. Serial No. 43,380. (No model.)

*To all whom it may concern:*

Be it known that I, FREDERIC AYRES JOHNSON, a citizen of the United States, residing at Binghamton, in the county of Broome and State of New York, have invented certain new and useful Improvements in Means for Controlling Electric Motors, of which the following is a specification.

My invention relates to means for controlling electric motors, and while it is intended more particularly for use in connection with motors it can be used with electric generators.

The invention is based on the general principles set forth in my Patent No. 597,418, granted January 18, 1898, and I do not deem it necessary to again set forth those principles further than to explain that in the present invention mechanical means are provided whereby the reluctance of the magnetic circuit is varied by simultaneously varying the reluctance of a portion of each pole-piece which may include one tip. The speed of the motor is thus varied, while the magnetic flux through those pole-tips under which commutation is taking place is maintained substantially constant, sparking being thus avoided. Mechanical means are also provided for varying the reluctance of the magnetic circuit by simultaneously varying the reluctance of the central portions of the pole-pieces, while the flux through both tips of every pole is maintained substantially constant.

While my invention may be applied to motors of various forms and constructions with any number of field-magnet poles, I have shown it in connection with a four-pole motor of the salient-pole type, and this will illustrate the invention sufficiently to enable those skilled in the art to adapt it to any particular form of motor or generator.

Figure 1:
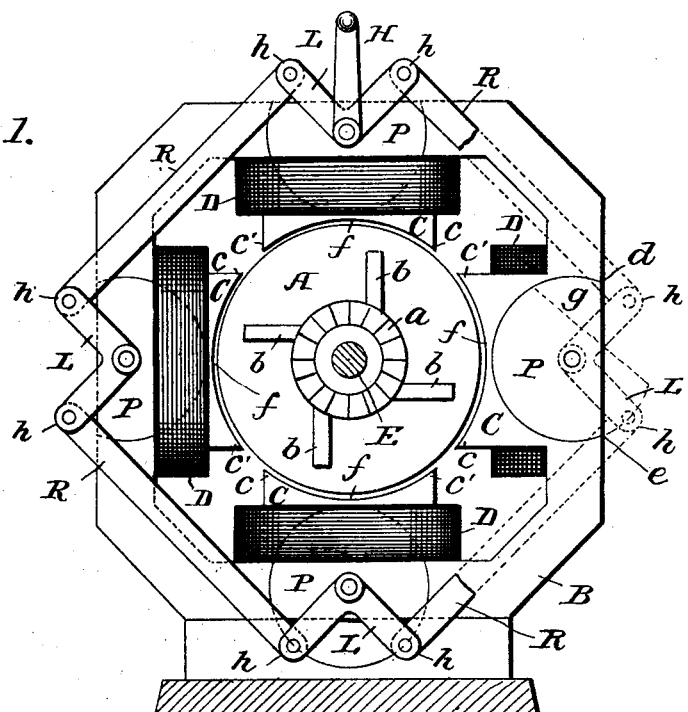
Figure 2:
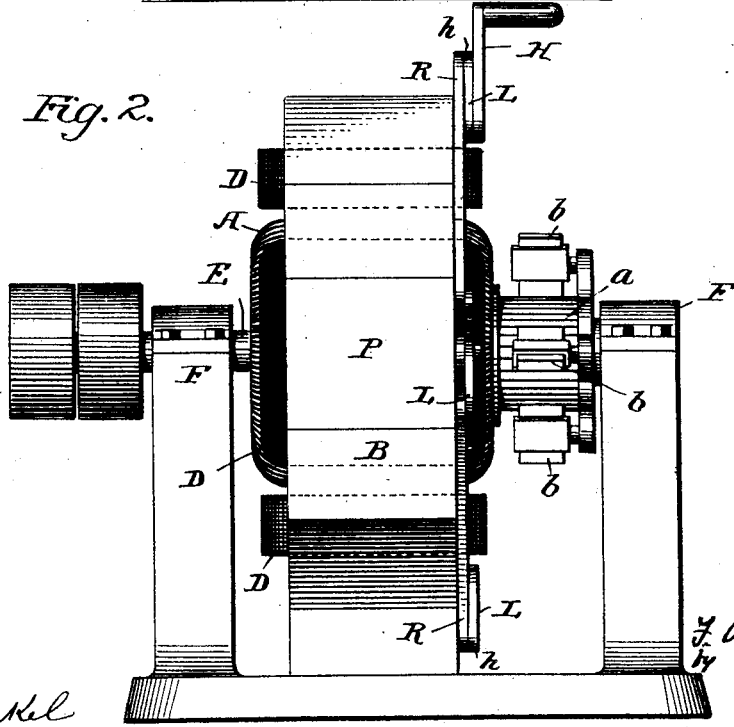
Figure 3:
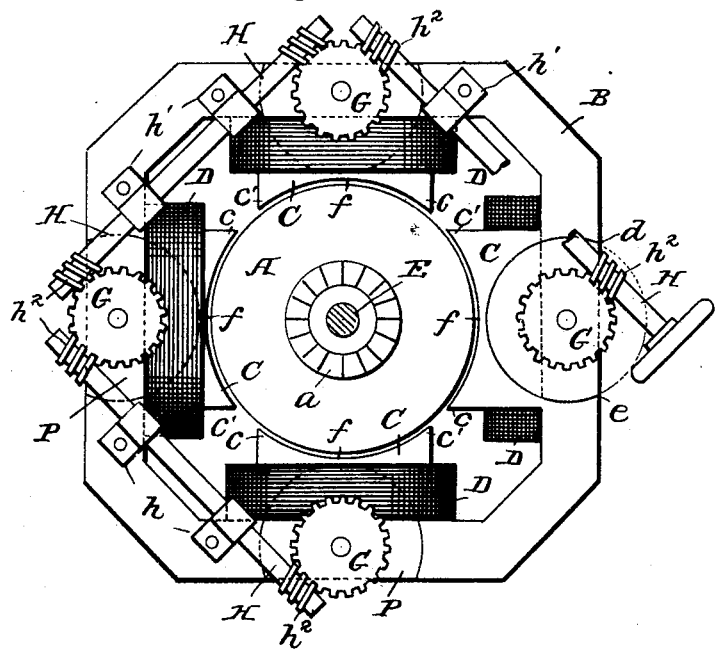
Figure 4:
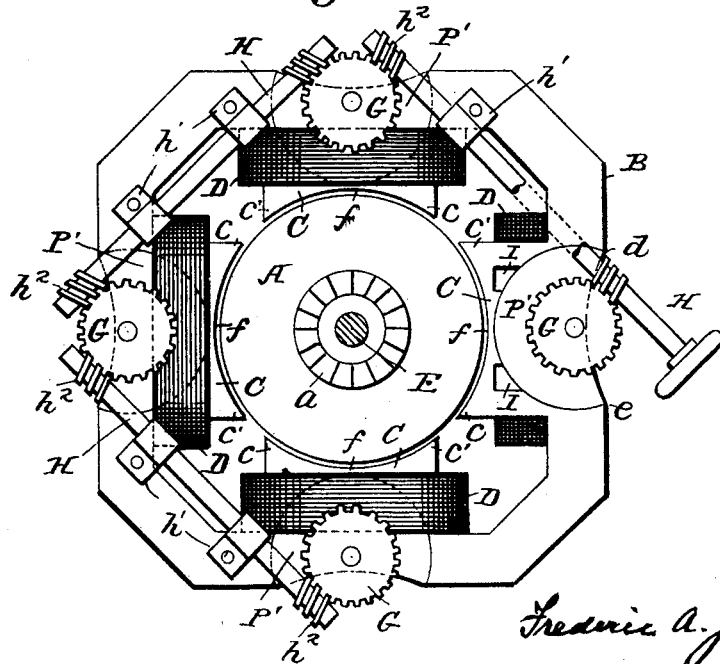

In the accompanying drawings, Figure 1 is a side view, partly in section, of a motor embodying my invention. Fig. 2 is a longitudinal elevation of the motor. Fig. 3 is a side view, partly in section, of a motor embodying a modification of my invention. Fig. 4 shows a modification of the adjustable core-pieces.

Referring to the drawings, A represents the armature, which may be of any desired form and construction, provided with the usual commutator $a$, brushes $b$, and armature-shaft E, journaled in suitable bearings F.

B represents the field-magnet frame, with salient field-magnet poles C, having tips $c\ c'$ and exciting-coils D. In each pole-piece C a cavity is formed of circular cross-section and preferably arranged with its imaginary longitudinal axis substantially parallel to the armature-shaft, so that the cavity is of cylindrical shape. These cavities may extend entirely through the frame B of the motor from side to side, and they may also reach almost to the pole-faces $f$. Their imaginary axes are preferably arranged to fall within the outer side of the magnet-frame D, so that the opening $d\ e$ of each cavity subtends an arc $d\ f\ e$ greater than a semicircle. Within the cavities are fitted core-pieces P, of soft iron, each lacking a portion of a symmetrical volume; but, as shown in Fig. 1, each lacks a segmental section, and in any case the cut surface should lie in or near the same plane as the outer surface of the frame, although this is not absolutely necessary, the essential feature being that the core-pieces P lack portions of their symmetrical volumes. The cut surfaces of the core-pieces may be hollowed or made somewhat concave, as P' in Fig. 4, instead of being made substantially plane surfaces. The utility of this form of construction will hereinafter appear. It will be seen that when coils D are energized by turning the core-pieces from the position shown in Fig. 1 in full lines to that shown in dotted lines the reluctance of the magnetic circuit through a portion of each pole-piece is varied because of the air-gap $g$ introduced in that portion. The magnetization through this part of each pole-piece will fall and the speed of the motor will increase; but the magnetization of pole-tips $c$, under which commutation is taking place, will remain substantially unchanged, since the air-gap does not extend to those tips, so that sparking will be avoided.

In order that the pole-pieces P may be simultaneously adjusted in the cavities through a limited angle, I have provided a system of suitably-connected levers and links. In this arrangement each core-piece is provided with levers L, rigidly attached to one end thereof and placed outside of the magnet-frame. These levers are connected pivotally at their outer ends $h$ by connecting-links R, as shown, and a crank H or other suitable mechanism is provided, attached to one pole-piece, by which the train of levers and links is actuated. It is therefore obvious that any angular movement imparted to that core-piece to which the crank is attached will be simultaneously transmitted to every other core-piece. In Fig. 3 is shown, however, a preferable mechanical construction by means of which the core-pieces P may be simultaneously rotated to any desired degree, as through one hundred and eighty degrees from the position shown in full lines to that shown in dotted lines in Fig. 3. Each core-piece is provided with a spur-gear G, attached to the core-piece concentrically with its longitudinal axis, and supported in bearings $h'$ are rotatable shafts H, having worms $h''$, meshing with the gears G. By turning a hand-wheel or other suitable device attached to a particular shaft the core-pieces may be simultaneously adjusted in the cavities of the field-magnet poles. When the core-pieces are rotated through one hundred and eighty degrees into the dotted position of Fig. 3, the magnetic flux through the centers of the pole-pieces will be varied, while that through both tips of every pole will remain substantially unchanged, since the air-gap $g'$ will fall somewhat within the tips.

By making the cut surfaces of the core-pieces concave instead of plane the reluctance at the centers of the pole-pieces may be further increased.

Grooves I, as shown in Fig. 4, may also be cored through the pole-pieces in the cavities adjacent to the pole-tips and substantially parallel to the armature-shaft to prevent the commutating-flux in the pole-tips from diffusing itself through the centers of the pole-pieces.

My invention allows of rotation of the armature in either direction, that pole-tip which is to be kept at a substantially constant magnetization depending, of course, upon the direction of rotation and upon whether the machine is being used as a motor or generator.

Without limiting myself to the precise details of construction shown and described, which may be varied in details without departing from the spirit of my invention, what I claim, and desire to obtain by Letters Patent, is as follows:

1. In an electric motor, the combination with the frame, of field-magnet poles having cavities, core-pieces in the cavities, and means for rotating the several core-pieces in the cavities in the same direction, substantially as described.

2. In an electric motor, the combination with the frame, of field-magnet poles having cavities, core-pieces in the cavities, means for rotating said core-pieces in the cavities, and grooves in the cavities, substantially as described.

3. As a means of varying the reluctance of the magnetic circuit in an electric motor, the combination with the frame, of field-magnet poles having cavities, core-pieces in the cavities, and means for simultaneously adjusting said core-pieces in the cavities, substantially as described.

4. In an electric motor, the combination with the frame, and armature and its shaft, of field-magnet poles having cavities, core-pieces fitting the cavities, and means for adjusting said core-pieces in the same direction in the cavities about axes substantially parallel to the armature-shaft, substantially as described.

5. In an electric motor, the combination with the frame, of field-magnet poles having cylindrical cavities, core-pieces fitting the cavities, and means for simultaneously adjusting said core-pieces in the same direction in the cavities, substantially as described.

6. As a means of varying the reluctance of the magnetic circuit in an electric motor, the combination with the frame, and armature and its shaft, of field-magnet poles having cylindrical cavities arranged substantially parallel to the armature-shaft, core-pieces fitting the cavities, and means for adjusting said core-pieces in the cavities, substantially as described.

7. In an electric motor, the combination with the frame and armature and its shaft, of field-magnet poles having cylindrical cavities arranged substantially parallel to the armature-shaft, core-pieces each lacking a portion of its symmetrical volume fitting the cavities, and means for simultaneously adjusting said core-pieces in the cavities, the said field-magnet poles having grooves in said cavities adjacent to the pole-tips and substantially parallel to the armature-shaft, substantially as set forth.

8. In an electric motor, the combination with the frame, of field-magnet poles having cavities, core-pieces in the cavities, spur-wheels connected to the core-pieces, and worms operatively connecting the spur-wheels to simultaneously rotate each spur-wheel and its core-piece in the same direction, substantially as set forth.

9. In an electric motor, the combination with the frame, of field-magnet poles having cavities, core-pieces in the cavities, spur-wheels connected to the core-pieces, shafts supported from the frame and provided with worms for engaging the spur-wheels, and means for rotating one of the shafts, whereby the core-pieces are simultaneously adjusted in the same direction, substantially as described.

10. In an electric motor, the combination with the frame, of field-magnet poles having cavities, and grooves in the cavities adjacent to the pole-tips, substantially as described.

In testimony whereof I have signed my name to this specification in the presence of two subscribing witnesses.

FREDERIC AYRES JOHNSON.

Witnesses:
F. W. JENKINS,
J. F. LOUGHLIN.